(12) United States Patent
Hällevall et al.

(10) Patent No.: US 11,351,904 B2
(45) Date of Patent: Jun. 7, 2022

(54) LOAD RETENTION SYSTEM

(71) Applicant: Metso Sweden AB, Trelleborg (SE)

(72) Inventors: Niclas Hällevall, Lund (SE); Henrik Persson, Trelleborg (SE); Andreas Hoffmann, Trelleborg (SE)

(73) Assignee: Metso Sweden AB, Trelleborg (SE)

( * ) Notice: Subject to any disclaimer, the term of this patent is extended or adjusted under 35 U.S.C. 154(b) by 0 days.

(21) Appl. No.: 16/969,660

(22) PCT Filed: Feb. 15, 2019

(86) PCT No.: PCT/EP2019/053757
§ 371 (c)(1),
(2) Date: Aug. 13, 2020

(87) PCT Pub. No.: WO2019/158673
PCT Pub. Date: Aug. 22, 2019

(65) Prior Publication Data
US 2020/0398727 A1 Dec. 24, 2020

(30) Foreign Application Priority Data
Feb. 16, 2018 (EP) ..................... 1815179

(51) Int. Cl.
*B60P 1/28* (2006.01)
*B60P 1/12* (2006.01)
(Continued)

(52) U.S. Cl.
CPC ................. *B60P 1/286* (2013.01); *B60P 1/12* (2013.01); *B60P 1/26* (2013.01); *B60P 7/135* (2013.01)

(58) Field of Classification Search
CPC .. B60P 1/286; B60P 1/28; B60P 3/423; B60P 1/283; B60P 1/16; B60P 1/26;
(Continued)

(56) References Cited

U.S. PATENT DOCUMENTS 3,773,385 A 11/1973 Sandberg
3,953,950 A * 5/1976 Sudyk ..................... B60R 13/01
 52/127.12
(Continued)

FOREIGN PATENT DOCUMENTS

CN 1098992 A 2/1995
CN 103395385 A 11/2013
(Continued)

OTHER PUBLICATIONS

International Search Report and Written Opinion for International Application No. PCT/EP2019/053757 dated Apr. 16, 2019.
(Continued)

*Primary Examiner* — D Glenn Dayoan
*Assistant Examiner* — Sunsurraye Westbrook
(74) *Attorney, Agent, or Firm* — Andrus Intellectual Property Law, LLP

(57) ABSTRACT

Retention system for a load carrying container, comprising a retention portion arrangeable at or near a rear end of a load carrying container. The retention portion is pivotable between a first, raised position and a second, lowered position; and a drive element is used for moving the pivotable retention portion between the first and second positions.

14 Claims, 2 Drawing Sheets

(51) Int. Cl.
    *B60P 1/26*    (2006.01)
    *B60P 7/135*   (2006.01)

(58) Field of Classification Search
    CPC .... B60P 1/165; B60P 3/42; B60P 1/00; B60P 1/04; B60P 1/38
    USPC ..... 298/17 R, 22 R, 1 R, 18, 1 B, 1 H, 19 R, 298/23 D, 23 DF, 23 R, 24; 296/183.2, 296/183.1, 184.1, 26.11, 98, 65.16, 65.09, 296/63, 41
    See application file for complete search history.

(56) References Cited

U.S. PATENT DOCUMENTS

| | | | | |
|---|---|---|---|---|
| 4,077,328 | A * | 3/1978 | Taylor | B60F 1/043 |
| | | | | 105/215.2 |
| 5,823,630 | A | 10/1998 | Graham | |
| 9,308,875 | B2 * | 4/2016 | Burstrom | B60P 1/286 |
| 2011/0181067 | A1 * | 7/2011 | Dunn | B60P 1/286 |
| | | | | 296/39.2 |

FOREIGN PATENT DOCUMENTS

| | | |
|---|---|---|
| EP | 2607161 A1 | 6/2013 |
| WO | 94/06649 | 3/1994 |
| WO | 03/043850 A1 | 5/2003 |

OTHER PUBLICATIONS

Office Action and Search Report for corresponding Chinese Patent Application No. 201980012563.3 dated Jan. 25, 2022.

* cited by examiner

LOAD RETENTION SYSTEM

CROSS-REFERENCE TO RELATED APPLICATIONS

This application is the U.S. national stage application of International Application PCT/EP2019/053757, filed Feb. 15, 2019, which international application was published on Aug. 22, 2019, as International Publication WO 2019/158673 A1 in the English language. The International Application claims priority of European Patent Application No. 18157179.5 filed Feb. 16, 2018.

FIELD OF THE INVENTION

The present invention relates to a retention system for a load carrying container, and to a load carrying container and a vehicle comprising such a retention system.

BACKGROUND OF THE INVENTION

In the mining industry, load carrying vehicles are used to transport mined material out of and between different locations in the mines. These load carrying vehicles generally have a load carrying container, also referred to as a truck box, with an open top and rear end, for easy loading and unloading of the material. It is of high interest to maximize the load capacity of the truck box to enable transportation of large quantities of material and thereby render the mining process as efficient as possible.

The design and structural materials for the truck box have thus been adapted to maximize load capacity. However, the load capacity is not only restricted by the dimensions of the truck box or its weight restrictions, but also of the travel path of the load carrying vehicle. In some locations, considerably steep hills within the mine can sometimes lead to an undesired loss of load due to material displacement towards the rearmost end of the truck box and spill therefrom.

Some attempts to remedy this problem have been made, for example by providing a truck box with a tailgate at its rear end. When transporting heavy material though, there can be a problem for the tailgate to resist the high loads resting thereon. A fixed tailgate can also have an impact on the unloading conditions requiring a higher tilt of the truck box when unloading to ensure complete unloading of the truck box. Another example provided is to suspend the truck box such that the inclination can be compensated for and the truck box remain more level than the vehicle as it traverses a steep hill. This type of suspension system, however, is quite costly and complex.

SUMMARY OF THE INVENTION

An object of the invention is to overcome, or at least lessen the above mentioned problems. A particular object is to provide an improved retention system for load carrying containers.

To better address this concern, in a first aspect of the invention there is presented a retention system for a load carrying container comprising a retention portion which is arrangeable at or near a rear end of a load carrying container. The retention portion is pivotable between a first, raised position and a second, lowered position. The retention system further comprises a drive element for moving the pivotable portion between the first and second positions, respectively.

The retention system allows for a higher load capacity as it is able to retain load which is displaced towards the rear of the truck box as the truck is e.g. driving uphill. When the truck box is loaded, the retention portion is set in the first position in which it is raised, such to provide a vertical or at least inclined wall which can prevent material from falling back with the force of gravity as the truck box is transported over a steep slope.

In accordance with an embodiment of the retention system, the drive element is arranged below the retention portion. By arranging it below the retention portion, simple and reliable force transmission is safeguarded.

In accordance with an embodiment of the retention system the drive element is operable from a distance. By being able to operate the system from e.g. the driver's cabin, use of the system is safe and saves time.

In accordance with an embodiment of the retention system, the drive element comprises an inflatable unit. An inflatable unit is space saving and can easily be applied at many locations.

In accordance with an embodiment of the retention system, the inflatable unit is inflated and deflated by means of a gas.

In accordance with an embodiment of the retention system, the inflatable unit is inflated and deflated by means of a liquid.

In accordance with an embodiment of the retention system the drive element comprises a mechanical hoisting element. Mechanical hoisting elements, comprising e.g. threaded hoisting elements, are powerful and simple in construction.

In accordance with an embodiment of the retention system the drive element comprises a hydraulic or pneumatic cylinder. Such cylinders are able to create high forces and can often use the existing systems of the mining truck.

In accordance with an embodiment of the retention system the retention portion is integrated in a lining of the load carrying container. By using the lining system of the container, substantial savings in material costs can be done in comparison with other retaining solutions.

In accordance with an embodiment of the retention system the lining is comprised of elements at least in part made from rubber. The use of rubber in the lining is advantageous, partly due to the capacity of rubber to absorb shocks and therefore, not break or permanently deform as load hits the lining. Furthermore, the elastic properties and the flexibility of rubber enables bending of the retention portion to the first, raised position, which provides the advantage of avoiding additional hinging elements or similar. The drive element can force a part of a liner element upwardly, thereby bending it without using any external hinging element. The use of rubber will create a smooth curvature at the bending position instead of a sharp edge that would typically be the case when using a hinge. Other possible materials for the lining comprises polyurethanes, polyurethanes and ceramics or possibly combinations thereof.

According to a second aspect of the invention, there is provided a load carrying container comprising a retention system as disclosed herein.

In accordance with an embodiment of the load carrying container, the retention portion is at an angle α with respect to a bottom of the load carrying container in the first, raised, position.

In accordance with an embodiment of the load carrying container, the angle α is between 90° and 180°.

In accordance with an embodiment of the load carrying container, the retention portion does not protrude from an upper surface of a bottom of the load carrying container in the second, lowered position. This facilitates the loading and the unloading process considerably.

In accordance with an embodiment of the load carrying container, a compartment is arranged in the load carrying container, wherein the drive element is located in said compartment. This makes it possible to keep the retention portion flush with the rest of the bottom of the container when it is in the second, lowered position. This means that the system has no drawbacks during e.g. unloading of that loaded material in comparison with a container according to prior art.

According to a third aspect of the invention, there is provided a load carrying vehicle comprising a load carrying container as disclosed herein.

According to a fourth aspect of the invention, there is provided a method for retaining material in a load carrying container, the method comprising providing a load carrying container. The method further comprises the step of setting the retention portion of the load carrying container in a first, raised position for loading and transportation of the load of said load carrying container.

Other objectives, features and advantages of the present invention will appear from the following detailed disclosure, from the attached claims, as well as from the drawings. It is noted that the invention relates to all possible combinations of features.

Generally, all terms used herein are to be interpreted according to their ordinary meaning in the technical field, unless explicitly defined otherwise herein. All references to "a/an/the [element, device, component, means, step, etc.]" are to be interpreted openly as referring to at least one instance of said element, device, component, means, step, etc., unless explicitly stated otherwise.

As used herein, the term "comprising" and variations of that term are not intended to exclude other additives, components, integers or steps.

BRIEF DESCRIPTION OF THE DRAWINGS

The invention will be described in more detail and with reference to the appended drawings in which.

DESCRIPTION OF EMBODIMENTS

Figure 1A:
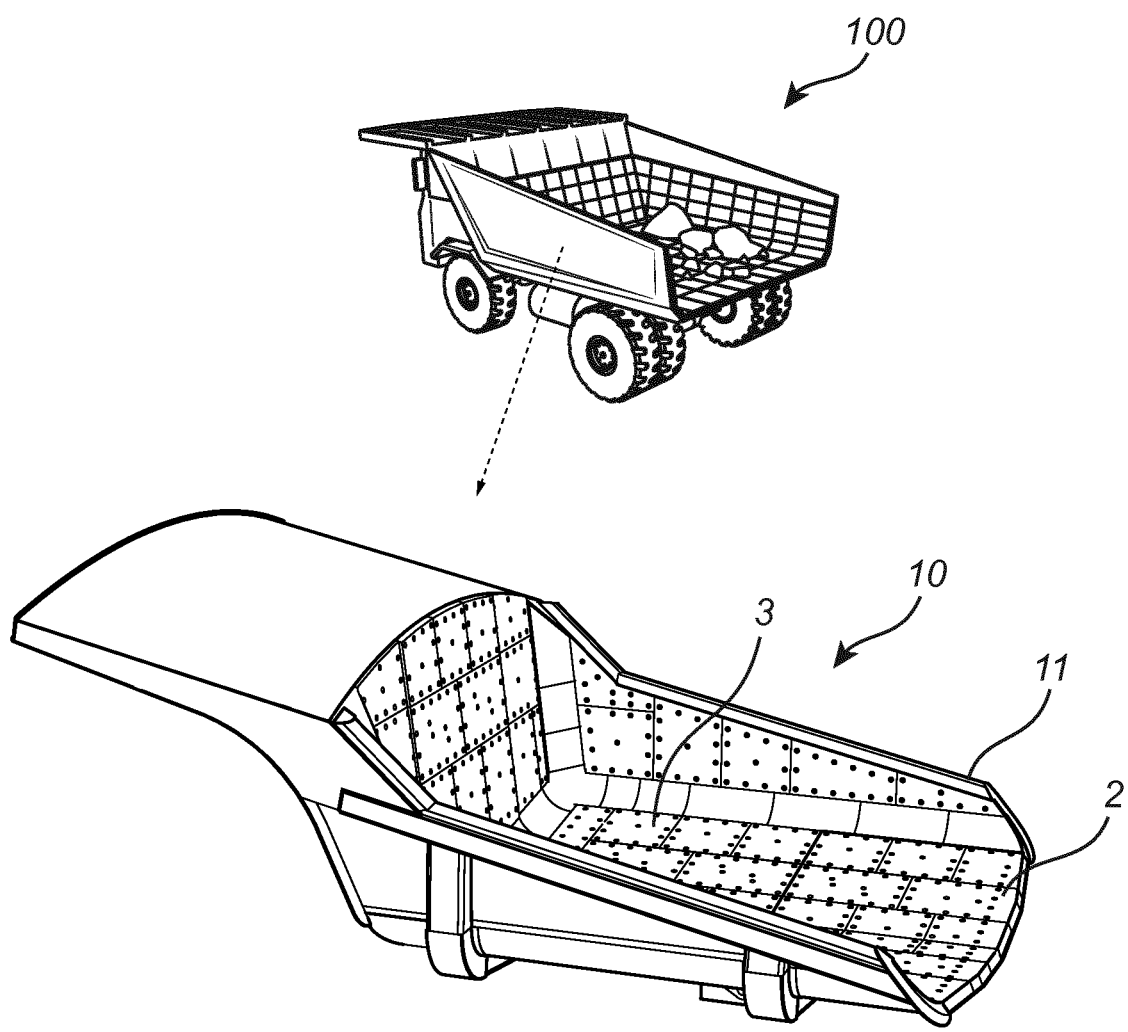
FIG. 1A is a schematic view of a load carrying vehicle and container with an embodiment of a retention system according to the invention.

The present invention will now be described more fully hereinafter with reference to the accompanying drawings, in which exemplifying embodiments of the invention are shown. The present invention may, however, be embodied in many different forms and should not be construed as limited to the embodiments set forth herein; rather, these embodiments are provided for thoroughness and completeness, and to fully convey the scope of the invention to the skilled addressee. Like reference characters refer to like elements throughout.

FIG. 1A shows an exemplifying embodiment of a load carrying vehicle 100 and a load carrying container 10. The load carrying container 10 comprises a lining 3 covering the load carrying surfaces of the load carrying container 10. The lining 3 here comprises a plurality of liner elements which are arranged in rows and columns at the load carrying surfaces of the load carrying container. The liner elements are generally of an elastic material, such as a rubber or a polyurethane. It is however possible to use other materials for the liner elements, as well as to combine liner elements of an elastic material with liner elements of another material, e.g. a metal. In the latter case, the liner elements of elastic material and the liner elements made of metal are arranged to cover different portions of the load carrying container 10 surface. An embodiment of the retention system 1 of the present invention is arranged at an open rear end 11 of the load carrying container 10, also referred to from hereinafter as a truck box. The retention system 1 comprises a retention portion 2 which is pivotable between a first, raised, retaining position and a second, lowered position. In the exemplifying embodiment shown in FIG. 1A, the retention portion 2 is in the second, lowered position, in which the retention portion 2 is flush with the bottom of the truck box 10. It is also possible, within the concept of the present invention, to provide a retention portion 2 which is not flush with the bottom of the truck box 10 in the second position. It is for example possible that the retention portion 2 is slightly inclined also in the second position.

Figure 1B:
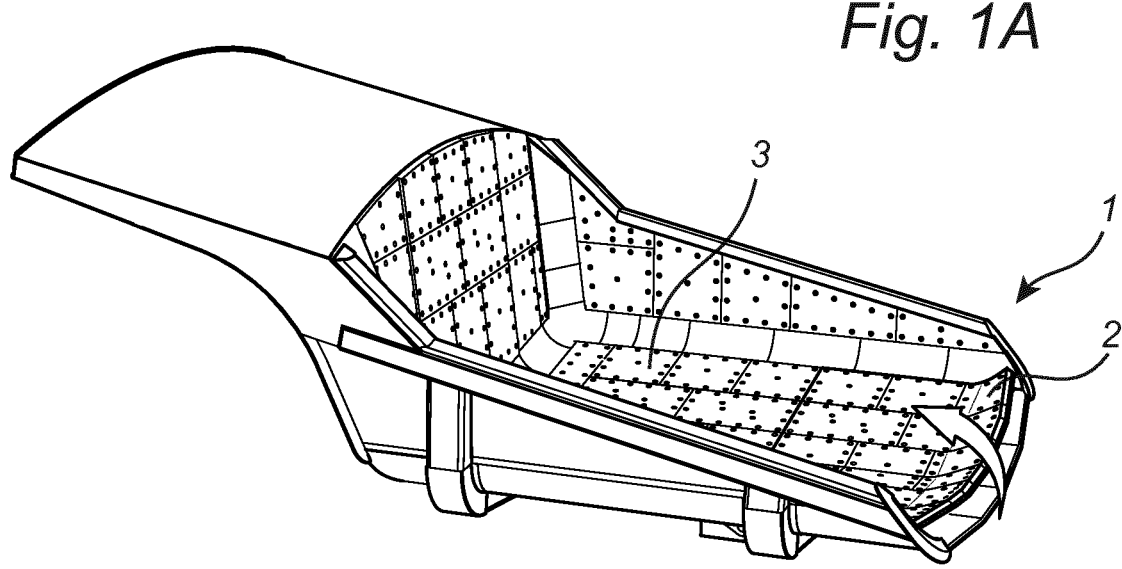
FIG. 1B is a schematic view of an embodiment of a retention system according to the invention.

FIG. 1B shows an exemplifying embodiment of a retention system 1 of a truck box 10, with the retention portion 2 in a first, raised position. In the example here shown, the retention system 1 is arranged at the rear end 11 of the truck box 10.

In the first, raised position, the retention portion 2 is arranged substantially upright, or inclined with respect to the bottom of the truck box 10. Typically, an angle $\alpha$ between the retention portion 2 and the bottom of the truck box is in the range of 90 to 180 degrees.

In the exemplifying embodiment of FIGS. 1A and 1B, the retention portion 2 is integrated with the lining 3 of the bottom of the truck box 10. More specifically, the retention portion 2 constitutes an end portion of the lining 3. In this embodiment, the end portion of the lining 3 constituted by the retention portion 2 is not attached to the base 15 of the truck box 10 (see FIGS. 2-4), contrary to the remaining portion of the lining 3. Here, at least the end portion of the lining 3, constituted by the retention portion 2, is made of an elastic material, suitable examples of which are rubber, polyurethane or materials having similar mechanical properties. The elasticity of this type of materials allows the retention portion 2 to be bent into the first, raised position, without the use of any external hinging elements. It is, however, also conceivable within the inventive concept to provide a retention portion 2 which is not integrated with the lining 3, but arranged for example on top of the lining 3.

Figure 2:
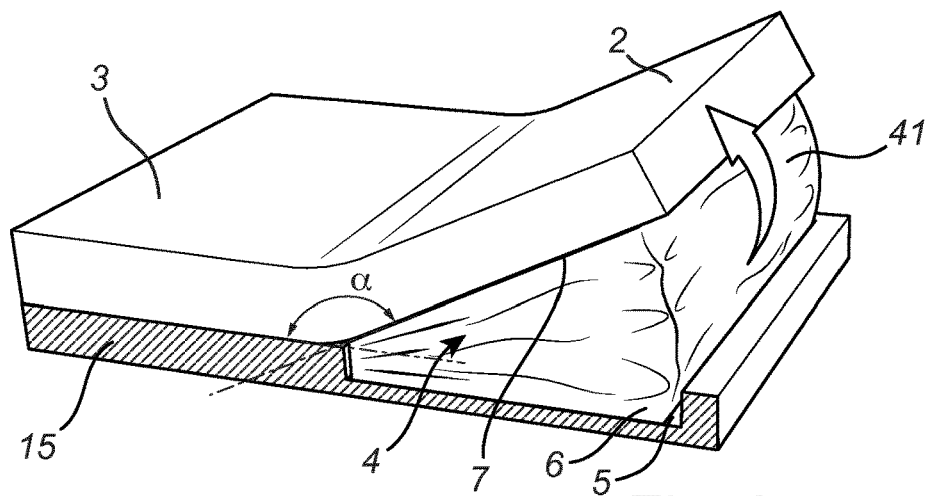
FIG. 2 is a schematic view of a second embodiment of a retention system according to the invention.
Figure 3:
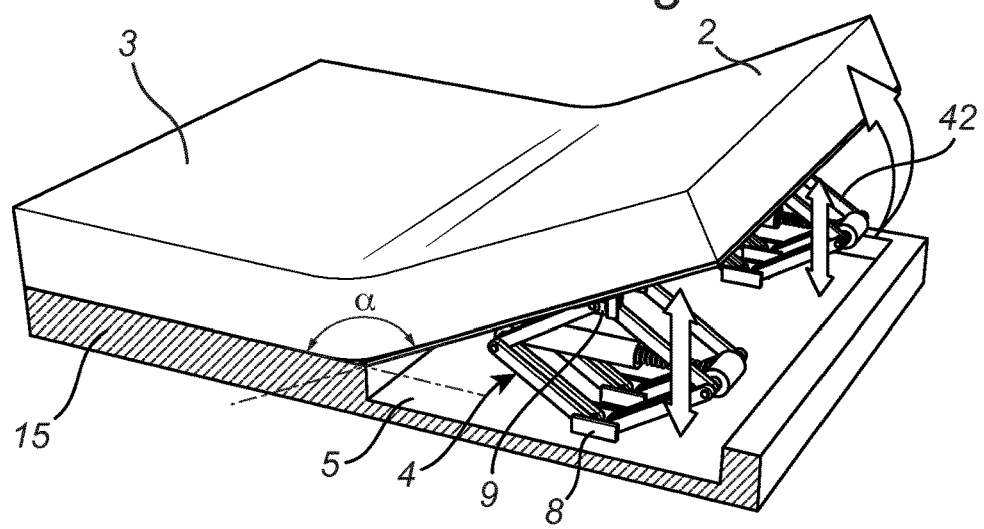
FIG. 3 is a schematic view of a third embodiment of a retention system according to the invention.
Figure 4:
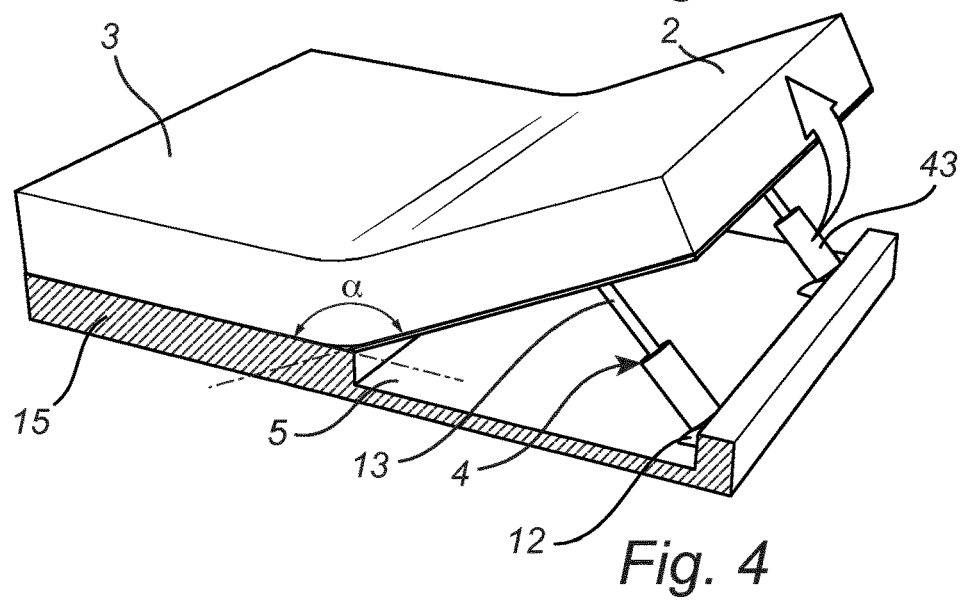
FIG. 4 is a schematic view of a fourth embodiment of a retention system according to the invention.

The retention system 1 further comprises a drive element 4 for moving the retention portion 2 between the first and second positions, see FIGS. 2-4. An embodiment of a drive element 4 of the retention system 1 according to the present invention is shown in FIG. 2. The drive element 4 is here arranged below the retention portion 2. In this exemplifying embodiment, the drive element 4 comprises an inflatable unit 41. The inflatable unit 41 can be inflated and deflated by means of the respective injection or extraction of a gas, such as air or any other gas suitable for the purpose. It can also be inflated or deflated by means of injection or extraction of a liquid, such as water or any other for the purpose suitable liquid.

The inflatable unit 41 comprises a bottom surface 6 and a top surface 7, and is, in the exemplifying embodiment, arranged below the lining 3 of the truck box 10. The top surface 7 is connected to the lower surface of the retention portion 2, here the lining 3 of the truck box 10. The base 15 of the truck box 10, at the location of the drive unit 4, comprises a recess 5. The bottom surface 6 of the inflatable unit 41 is connected to the upper surface of the recess 5. The recess 5 is arranged for receiving the inflatable unit 41, partly or completely, when it is in a deflated state, corresponding to the second, lowered position of the retention portion 2. The recess 5 is preferably arranged to receive the deflated inflatable unit 41 completely, such that the retention portion 2 does not protrude from an upper surface of the bottom of the truck box 10 in the second, lowered position. The recess 5 thus enables the retention portion 2 to be flush with the bottom of the truck box 10 in the second position.

Another embodiment of the drive unit 4 of the retention system 1 according to the present invention is shown in FIG. 3. Here, the driving element 4 comprises two mechanically operable hoisting elements 42. The hoisting elements 42 are arranged below the retention portion 2 and at least partly received in the recess 5 in the base 15 of the truck box 10. Furthermore, the hoisting elements comprise a first end 8 and a second end 9. The first end 8 of the hoisting elements 42 is connected with the recess 5 of the base 15 of the truck box 10. The second end 9 of the hoisting elements 42 is connected with a lower surface of the retention portion 2.

The hoisting elements 42 are furthermore operable between an extended position, corresponding to the first, raised position of the retention portion 2, and a compressed position, corresponding to the second, lowered, position of the retention portion 2. The recess 5 is preferably arranged to completely receive the hoisting elements 42. In this case, the retention portion 2 is flush with the upper surface of the bottom of the truck box 10 when in the second, lowered position. However, it is also possible to provide hoisting elements 42 which are partly receivable in the recess 5, such that the retention portion 2 is slightly inclined in the second position. It should furthermore be pointed out that the number of hoisting elements 42 is not limited to two. Therefore, a retention system 1 comprising one or three or more hoisting elements 42 is also conceivable within the concept of the present invention.

A fourth embodiment of the drive unit 4 of the retention system 1 according to the present invention is shown in FIG. 4. The drive unit 4 of the retention system 1 here exemplified comprises two pneumatic or hydraulic cylinders 43. The cylinders 43 comprise a first end 12 and a second end 13, and are arranged below the retention portion 2. The first end 12 of each cylinder 43 is connected with the recess 5 of the base 15 of the truck box 10. The second end 13 of each cylinder 43 is connected to a lower surface of the retention portion 2. The cylinders 43 are thus at least partly receivable in the recess 5 of the base 15 of the truck box 10.

The cylinders 43 are furthermore extendible. As the cylinders are extended, the retention portion 2 is raised to the first, raised position. As the cylinders are collapsed, the retention portion 2 is lowered to the second, lowered position. In this position, the cylinders 43 are completely receivable in the recess 5 of the base 15 of the truck box 10, such that the retention portion 2 is flush with the bottom of the truck box 10. It is also possible, however, that the cylinders 43 are partly received in the recess 5, such that the retention portion 2 rests slightly inclined in the second position. A person skilled in the art realizes that any number of cylinders 43, such as for example one or three or more, is also conceivable within the concept of the present invention.

The drive unit 4 can be operable at a distance from the retention system 1. For example, the drive unit 4 can be controlled from a driver's seat of the load carrying vehicle 100 onto which a truck box 10 with the retention system 1 is mounted. It is also possible to control the drive unit 4 from a location on the truck box 10, or from a position outside of the truck box 10 or of the load carrying vehicle 100.

In an embodiment of the retention system 1, a locking device (not shown) is provided. The locking device is arranged to lock the retention portion 2 in the second, lowered position. In this position, the retention portion is substantially flush with respect to the bottom of the truck box.

The skilled person realizes that a number of modifications of the embodiments described herein are possible without departing from the scope of the invention, which is defined in the appended claims. For example, it is also possible to provide a retention system 1 which permanently maintains the retaining position. In this case, the retention portion 2 comprises an upwardly inclined upper surface and is generally of a somewhat triangular geometry, extending from the bottom of the truck box to the inclined surface. Such a retention portion 2 may constitute an end portion of the lining 3, which has a thickness that increases towards the end thereof.

The skilled person also realizes that even though the embodiments show that the retention portion comprises several rows and columns of liner elements, it is also possible to use one row only. Preferably the rearmost row of liner elements. The fact that many lining solutions for truck boxes comprise liner elements made from rubber makes it possible to create a hinged pivoting point, or rather hinged pivoting line in the liner element as such. This means that only a forwardmost part of the rearmost row of liner elements may be attached, by bolting or any other suitable means, to the truck box, whereas the rearmost part of the rearmost row of liner elements are attached to the drive element. As the drive element is activated, the liner element(s) will pivot by bending along a line, creating the mentioned hinge. The skilled person further realizes that the present invention also makes it possible to alter the tipping point of the load carrying container by changing the position of the retention portion. Also, the material flow rate during unloading can be affected by changing the position of the retention portion during unloading.

Further, the skilled person realizes that it is convenient to protect the drive unit from rock, gravel, debris and similar which may clog parts of the drive unit and bring the drive unit out of order. This could be done by encapsulating the drive unit such that it is protected from intrusion of such material also when the retention portion is in a semi-raised position. The encapsulation can be achieved in different ways, e.g. by arranging a flexible membrane (plastic, textile etc.) surrounding the drive unit. Other solutions are also conceivable, for example a telescopically extendable encapsulation.

The skilled person also realizes that the drive unit does not necessarily have to be arranged in a recess in the base only. It is also possible to provide a similar recess in the lining, in combination with the recess in the base or as an alternative thereto. Further, it is possible to arrange the drive unit in a box or similar which is attached to an underside of the base such that the drive unit extends through an opening in the base and is attached to a lower surface of the retention portion.

The invention claimed is:

1. A retention system for a load carrying container including a lining and a rear end, comprising:
   a retention portion arrangeable at or near the rear end of the load carrying container, which retention portion is pivotable between a first, raised position and a second, lowered position; and
   a drive element for moving the retention portion between the first and second positions wherein the retention portion comprises an end portion of the lining of the load carrying container.

2. The retention system according to claim 1, wherein the drive element is arranged below the retention portion.

3. The retention system according to claim 1 wherein the drive element is operable from a distance.

4. A retention system for a load carrying container including a rear end, comprising:
   a retention portion arrangeable at or near the rear end of the load carrying container, which retention portion is pivotable between a first, raised position and a second, lowered position; and
   a drive element for moving the retention portion between the first and second positions, wherein the drive element comprises an inflatable unit.

5. The retention system according to claim 4, wherein the inflatable unit can be inflated and deflated by a gas.

6. The retention system according to claim 4, wherein the inflatable unit is inflated and deflated by a liquid.

7. The retention system according to claim 1 wherein the drive element comprises a mechanical hoisting element.

8. The retention system according to claim 1 wherein the drive element comprises a hydraulic cylinder or a pneumatic cylinder.

9. The retention system according to claim 1, wherein the lining comprises elements at least in part made from rubber.

10. A load carrying container comprising:
    a rear end;
    a lining;
    a retention system including a retention portion arrangeable at or near the rear end, which retention portion is pivotable between a first, raised position and a second, lowered position; and
    a drive element for moving the retention portion between the first and second positions, wherein the retention portion comprises an end portion of the lining of the load carrying container.

11. The load carrying container according to claim 10, wherein the retention portion does not protrude from an upper surface of a bottom of the load carrying container in the second, lowered position.

12. The load carrying container according to claim 10 further comprising a compartment, wherein the drive element is located in the compartment.

13. A load carrying vehicle comprising a load carrying container according to claim 12.

14. A method for retaining material in a load carrying container, the method comprising the steps of:
    providing a load carrying container according to claim 10; and
    setting the retention portion of said load carrying container in a first, raised position for loading and transportation of the load of said load carrying container.

* * * * *